(12) United States Patent
Garnepudi et al.

(10) Patent No.: US 10,600,108 B2
(45) Date of Patent: Mar. 24, 2020

(54) WEB SESSION SECURITY AND COMPUTATIONAL LOAD MANAGEMENT

(71) Applicant: Target Brands, Inc., Minneapolis, MN (US)

(72) Inventors: Srikanth Garnepudi, Minneapolis, MN (US); Amit Yatagiri, Bangalore (IN)

(73) Assignee: Target Brands, Inc., Minneapolis, MN (US)

( * ) Notice: Subject to any disclaimer, the term of this patent is extended or adjusted under 35 U.S.C. 154(b) by 658 days.

(21) Appl. No.: 15/276,161

(22) Filed: Sep. 26, 2016

(65) Prior Publication Data
US 2018/0089743 A1    Mar. 29, 2018

(51) Int. Cl.
| | | |
|---|---|---|
| *H04L 29/06* | (2006.01) | |
| *H04L 29/08* | (2006.01) | |
| *G06Q 30/06* | (2012.01) | |
| *G06F 9/44*  | (2018.01) | |

(52) U.S. Cl.
CPC ..... *G06Q 30/0633* (2013.01); *H04L 63/0414* (2013.01); *H04L 67/02* (2013.01); *H04L 67/142* (2013.01)

(58) Field of Classification Search
CPC ........... G06Q 30/0601; G06Q 30/0633; G06Q 30/0641; G06Q 20/20; G06F 2221/2119; G06F 9/44
See application file for complete search history.

(56) References Cited

U.S. PATENT DOCUMENTS

| | | | | |
|---|---|---|---|---|
| 6,510,458 B1* | 1/2003 | Berstis | ................ | G06F 16/9574 709/219 |
| 8,190,493 B2* | 5/2012 | Saarinen | ............ | G06Q 30/0601 705/26.1 |
| 8,326,690 B2* | 12/2012 | Dicker | .................. | G06Q 30/02 705/14.54 |
| 8,402,141 B2 | 3/2013 | Seraphin | | |
| 8,433,680 B2 | 4/2013 | Ling et al. | | |
| 8,738,661 B1 | 5/2014 | Floyd | | |
| 8,799,359 B2 | 8/2014 | Stanev et al. | | |
| 2001/0044751 A1* | 11/2001 | Pugliese, III | .......... | G06Q 30/02 705/14.1 |
| 2002/0010625 A1* | 1/2002 | Smith | .................... | G06Q 30/02 705/14.52 |
| 2002/0013834 A1* | 1/2002 | Esakov | ................. | G06F 16/954 709/223 |

(Continued)

OTHER PUBLICATIONS https://www.hostedpci.com/express-checkout-html-guide/ (Year: 2015).*

(Continued)

*Primary Examiner* — Ariel J Yu
*Assistant Examiner* — Dana Amsdell
(74) *Attorney, Agent, or Firm* — Westman, Champlin & Koehler, P.A.; Theodore M. Magee

(57) ABSTRACT

A computer-implemented method includes receiving a request for a webpage together with an identifier for a web session and determining that the web session has expired. Information entered by a user that would have appeared in the webpage before the web session expired is retrieved and at least some of the retrieved information is partially masked in response to the determination that the web session has expired. The webpage is then returned with the partially masked information.

12 Claims, 18 Drawing Sheets

(56) References Cited

U.S. PATENT DOCUMENTS

| | | | |
|---|---|---|---|
| 2002/0072980 A1* | 6/2002 | Dutta | G06Q 30/06 705/26.62 |
| 2002/0099936 A1* | 7/2002 | Kou | H04L 63/0442 713/151 |
| 2002/0143637 A1 | 10/2002 | Shmueli et al. | |
| 2003/0233361 A1 | 12/2003 | Cady | |
| 2004/0204998 A1* | 10/2004 | Shah | G06Q 20/20 705/16 |
| 2005/0278231 A1* | 12/2005 | Teeter | G06Q 10/107 705/14.51 |
| 2007/0233579 A1* | 10/2007 | Saarinen | G06Q 30/0601 705/26.8 |
| 2007/0266089 A1* | 11/2007 | Atarius | H04L 67/303 709/204 |
| 2009/0103725 A1* | 4/2009 | Tang | G06Q 20/20 380/45 |
| 2009/0132424 A1* | 5/2009 | Kendrick | G06Q 20/20 705/75 |
| 2009/0254590 A1* | 10/2009 | Shlomai | G06Q 10/10 |
| 2010/0191619 A1* | 7/2010 | Dicker | G06Q 30/02 705/26.1 |
| 2012/0005038 A1* | 1/2012 | Soman | G06Q 20/12 705/26.41 |
| 2012/0173881 A1* | 7/2012 | Trotter | H04L 9/0825 713/189 |
| 2013/0054468 A1* | 2/2013 | Fuentes | G06Q 20/108 705/64 |
| 2014/0019298 A1* | 1/2014 | Suchet | G06Q 30/0633 705/26.8 |
| 2014/0282978 A1* | 9/2014 | Lerner | H04L 63/083 726/7 |
| 2015/0134956 A1* | 5/2015 | Stachura | H04L 63/0807 713/168 |
| 2015/0142982 A1 | 5/2015 | Gonzales et al. | |
| 2015/0177934 A1 | 6/2015 | Carrillo et al. | |
| 2015/0237147 A1 | 8/2015 | Sundaresan | |
| 2015/0309970 A1* | 10/2015 | Wuellner | G06F 1/3203 715/234 |
| 2016/0173540 A1* | 6/2016 | Linden | H04L 65/1083 705/26.8 |
| 2016/0357363 A1* | 12/2016 | Decker | G06F 3/165 |
| 2017/0078326 A1* | 3/2017 | Child | H04L 63/08 |
| 2017/0171318 A1* | 6/2017 | Levithan | H04L 67/14 |

OTHER PUBLICATIONS

Codinghonror.com, "Your Session Has Timed Out", https://blog.codinghorror.com/your-session-has-timed-out/, Accessed May 26, 2016, 2 pages.

Persistent Shopping Carts, "Are You Frustrating Shoppers Because Your Website Is Timing Out?", http://mywifequitherjob.com/persistent-shopping-carts/, Accessed May 26, 2016, 5 pages.

ProductCart Wiki, "Saved Shopping Carts", http://productcart.com/productcart/savedshoppingcarts, Accessed May 26, 2016, 3 pages.

* cited by examiner

600

608

SIGN IN

DELIVERY

CONTACT INFO 604

EMAIL ADDRESS
jsmith@notemail.com

PHONE NUMBER
222-222-2222

SHIPPING INFO 602

FULL NAME
John Smith

ADDRESS
900 Second Av

APT, SUITE, ETC (OPTIONAL)

CITY
Big City

Minnesota

ZIP
55555

SHIPPING METHOD 606

| DVD 2 | VIDEO |

● GET IT BY 7/9
   STANDARD SHIPPING

○ GET IT BY 7/1
   PREMIUM SHIPPING

○ GET IT BY 6/30
   EXPRESS SHIPPING

ORDER SUMMARY

SUBTOTAL (1 ITEM)    $6.38
DELIVERY             $4.00
TAX                  $0.00
TOTAL                $10.38

CART NUMBER: 103195016412

SAVE & CONTINUE

SIGN IN

| DELIVERY | EDIT |

PAYMENT

702

PAYMENT METHOD
■ CREDIT OR DEBIT CARD

9999999
EXPIRES
02FEB   2020
SECURITY CODE
271

☐ GIFTCARD
APPLY UP TO 4. SIGN IN TO SEE SAVED CARDS

☐ ELECTRONIC PAYMENT SERVICE CANNOT BE COMBINED WITH OTHER METHODS

BILLING ADDRESS
☐ SAME AS SHIPPING ADDRESS

UNITED STATES ▼

FULL NAME
Betty Jones

ADDRESS
1415 Main Street

APT, SUITE, ETC (OPTIONAL)

ZIP
51111

704

ORDER SUMMARY

SUBTOTAL (1 ITEM)   $6.38
DELIVERY            $4.00
TAX                 $0.00

TOTAL               $10.38

CART NUMBER: 103195016412

SAVE & CONTINUE

SIGN IN

DELIVERY | EDIT

PAYMENT

PAYMENT METHOD
■ CREDIT OR DEBIT CARD

CARD NUMBER

☐ GIFTCARD
APPLY UP TO 4. SIGN IN TO SEE SAVED CARDS

☐ ELECTRONIC PAYMENT SERVICE CANNOT BE COMBINED WITH OTHER METHODS

BILLING ADDRESS
☐ SAME AS SHIPPING ADDRESS

UNITED STATES

FULL NAME

ADDRESS

APT, SUITE, ETC (OPTIONAL)

ZIP

ORDER SUMMARY

| | |
|---|---|
| SUBTOTAL (1 ITEM) | $6.38 |
| DELIVERY | $4.00 |
| TAX | $0.00 |
| TOTAL | $10.38 |

CART NUMBER: 103195016412

SAVE & CONTINUE

SIGN IN — 1006

DELIVERY

CONTACT INFO — 1004

EMAIL ADDRESS

PHONE NUMBER

SHIPPING INFO — 1002

FULL NAME

ADDRESS

APT, SUITE, ETC (OPTIONAL)

CITY

Minnesota

ZIP

SHIPPING METHOD — 1008

DVD 2

VIDEO
- ● GET IT BY 7/9 STANDARD SHIPPING
- ○ GET IT BY 7/1 PREMIUM SHIPPING
- ○ GET IT BY 6/30 EXPRESS SHIPPING

ORDER SUMMARY

| | |
|---|---|
| SUBTOTAL (1 ITEM) | $6.38 |
| DELIVERY | $4.00 |
| TAX | $0.00 |
| TOTAL | $10.38 |

CART NUMBER: 103195016412

SAVE & CONTINUE

1200

| BACK TO CART  1206 | | SIGN IN |
|---|---|---|
| DELIVERY | | |
| CONTACT INFO | ORDER SUMMARY | |
| | SUBTOTAL (2 ITEM) | $11.38 |
| EMAIL ADDRESS | DELIVERY | $8.00 |
| | TAX | $1.51 |
| PHONE NUMBER | TOTAL | $20.89 |
| SHIPPING ADDRESS  1208 | CART NUMBER: 9216055628545 | |
| FULL NAME | | |
| ADDRESS | | |
| APT, SUITE, ETC (OPTIONAL) | | |
| ZIP | | |
| CITY | | |
| STATE | | |
| SHIPPING METHOD | | |
| DVD 2   VIDEO | | |
| DVD 5   VIDEO | | |
| ● GET IT BY 8/3 STANDARD SHIPPING | | |
| ○ GET IT BY 7/29 PREMIUM SHIPPING | | |
| ○ GET IT BY 7/28 EXPRESS SHIPPING | SAVE & CONTINUE | |

SIGN IN

DELIVERY       1304

CONTACT INFO

EMAIL ADDRESS
jXXXXX@nXXXXX.COM

PHONE NUMBER
2XX-XXX-XXXX

SHIPPING INFO    1302

FULL NAME
JXXX SXXXX

ADDRESS
9XX SXXXXX AX

APT, SUITE, ETC (OPTIONAL)

CITY
BXX CXXX

ZIP

SHIPPING METHOD

1306

| DVD 2 | VIDEO |

● GET IT BY 7/6 STANDARD SHIPPING
○ GET IT BY 7/1 PREMIUM SHIPPING
○ GET IT BY 6/30 EXPRESS SHIPPING

| ORDER SUMMARY | |
|---|---|
| SUBTOTAL (1 ITEM) | $6.38 |
| DELIVERY | $4.00 |
| TAX | $0.00 |
| TOTAL | $10.38 |

CART NUMBER: 103195016412

1308

SAVE & CONTINUE

SIGN IN

| DELIVERY | EDIT |

PAYMENT   1402

PAYMENT METHOD
■ CREDIT OR DEBIT CARD

XXXXX-X999
EXPIRES
XXXX    XXXX
SECURITY CODE
XXX

☐ GIFTCARD
APPLY UP TO 4. SIGN IN TO SEE SAVED CARDS

☐ ELECTRONIC PAYMENT SERVICE CANNOT BE COMBINED WITH OTHER METHODS

1404

BILLING ADDRESS
☐ SAME AS SHIPPING ADDRESS
UNITED STATES ▾
FULL NAME
BXXXX JXXXX
ADDRESS
1XXX MXXX SX
APT, SUITE, ETC (OPTIONAL)
ZIP
5XXXX

ORDER SUMMARY
SUBTOTAL (1 ITEM)   $6.38
DELIVERY            $4.00
TAX                 $0.00
TOTAL               $10.38

CART NUMBER: 103195016412

SAVE & CONTINUE

SIGN IN

DELIVERY

CONTACT INFO

EMAIL ADDRESS
jXXXX@nXXXXXXX.COM

PHONE NUMBER
333-333-3333

1504

SHIPPING INFO

FULL NAME
JXXX SXXXX

ADDRESS
9XX SXXXXX AX

APT, SUITE, ETC (OPTIONAL)

CITY
BXX CXXX

Minnesota

ZIP
5XXXX

SHIPPING METHOD

DVD 2

VIDEO
● GET IT BY 7/6
   STANDARD SHIPPING
○ GET IT BY 7/1
   PREMIUM SHIPPING
○ GET IT BY 6/30
   EXPRESS SHIPPING

ORDER SUMMARY

| | |
|---|---|
| SUBTOTAL (1 ITEM) | $6.38 |
| DELIVERY | $4.00 |
| TAX | $0.00 |
| TOTAL | $10.38 |

CART NUMBER: 103195016412

1510

SAVE & CONTINUE

SIGN IN

DELIVERY   1704

CONTACT INFO   1706

EMAIL ADDRESS
jsmith@notemail.com

PHONE NUMBER
333-333-3333

SHIPPING INFO   1710   1708

FULL NAME
John Smith

ADDRESS
900 Second Av

APT, SUITE, ETC (OPTIONAL)

CITY
Big City

Minnesota

ZIP
55555

SHIPPING METHOD

| DVD 2 | VIDEO  1712 |

● GET IT BY 7/6 STANDARD SHIPPING
○ GET IT BY 7/1 PREMIUM SHIPPING
○ GET IT BY 6/30 EXPRESS SHIPPING

ORDER SUMMARY

| SUBTOTAL (1 ITEM) | $6.38 |
| DELIVERY | $4.00 |
| TAX | $0.00 |
| TOTAL | $10.38 |

CART NUMBER: 103195016412

SAVE & CONTINUE

FIG. 17

WEB SESSION SECURITY AND COMPUTATIONAL LOAD MANAGEMENT

BACKGROUND

When a client device requests a website's page from a webserver, the webserver initiates a web session. Using the web session, the webserver is able to track interactions between the client device and the collection of webpages that form the website. This session information includes information provided by the user of the client device through a number of different webpages that form the website. For example, for a retail website, the session information can include the contents of the electronic shopping cart, billing addresses, payment methods, shipping addresses and contact information.

Because of the large number of visitors to retail websites, server memories are not large enough to maintain session information indefinitely. As a result, session information must be deleted from the server after a period of time. In addition, stored session information represents a security risk for users. For example, if a user walks away from a client device after entering information on a website, a new user may access the client device and retrieve the entered information simply by revisiting the pages of the website that contain the entered information. To avoid this security risk, some webservers terminate web sessions after some period of inactivity from the client device and delete all of the information entered during the terminated web session.

Although this strategy improves security for the user, the disappearance of all the information the user previously entered is annoying to the user and degrades the performance of the webserver. In particular, since the entered information is removed when the session expires, the webserver must serve additional pages to again receive and store the lost information. This requires more processor time and thus degrades the overall performance of the server.

The discussion above is merely provided for general background information and is not intended to be used as an aid in determining the scope of the claimed subject matter. The claimed subject matter is not limited to implementations that solve any or all disadvantages noted in the background.

SUMMARY

A computer-implemented method includes receiving a request for a webpage together with an identifier for a web session and determining that the web session has expired. Information entered by a user that would have appeared in the webpage before the web session expired is retrieved and at least some of the retrieved information is partially masked in response to the determination that the web session has expired. The webpage is then returned with the partially masked information.

In a further embodiment, a method includes receiving a request for a webpage together with an identifier for an expired session. All items contained in an electronic shopping cart of the expired session are placed into a shopping cart for a new session. A webpage that indicates the contents of the shopping cart of the new session is then returned along with an identifier for the new session.

In a still further embodiment, a server includes a memory and a processor. The memory contains session storage and registered user storage, the session storage comprising information collected during a web session and the registered user storage comprising information collected for a registered user. The processor performs steps including determining that a current user is not logged in and retrieving information provided by a registered user from the registered user storage. At least some of the retrieved information is partially masked and is returned to a client device. Changes to one field of partially masked information is received from the client device and the changes are stored in the session storage instead of the registered user storage.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 6 is an example of a user interface for entering contact information and a shipping address during an active session.

FIG. 7 is an example of a user interface for entering payment and billing information during an active session.

FIG. 9 is a user interface showing payment and billing information for an expired session when there was no previous login.

FIG. 10 shows an example user interface of contact, shipping and shipping method information for an expired session when there was no previous login.

FIG. 12 provides an example user interface showing an additional item added to a cart from a previously expired session with no previous login.

FIG. 13 provides an example user interface showing contact, shipping and shipping method information for an expired session where there was a previous login.

FIG. 14 shows an example of a user interface showing payment and billing information for an expired session where there was a previous login.

FIG. 15 provides an example user interface showing contact information, shipping formation and shipping method information for an expired session with a previous login where the user has modified some of the information from the expired session.

FIG. 17 provides an example user interface after a user has logged in again after an expired session.

DETAILED DESCRIPTION

The embodiments described below improve the security of client devices interacting with webservers while reducing the amount of information that must be reentered by a user and reprocessed by a webserver when a session expires. In particular, the embodiments remove or mask information that is particular to an individual after a session expires while retaining information that is not particular to an individual. As a result, after a session expires, requests for additional webpages will include public information entered while the session was active but will not include private information that was entered while this session was active. In one particular embodiment, private information is partially masked before being returned after a session has expired such that the person who entered the information knows what the partially-masked information represents but other users will not know what the partially-masked information represents. Further, users are allowed to build upon the information that is returned from an expired session during a new session and the changes made during the new session can be used to complete a transaction between the user and the webserver.

Figure 1:
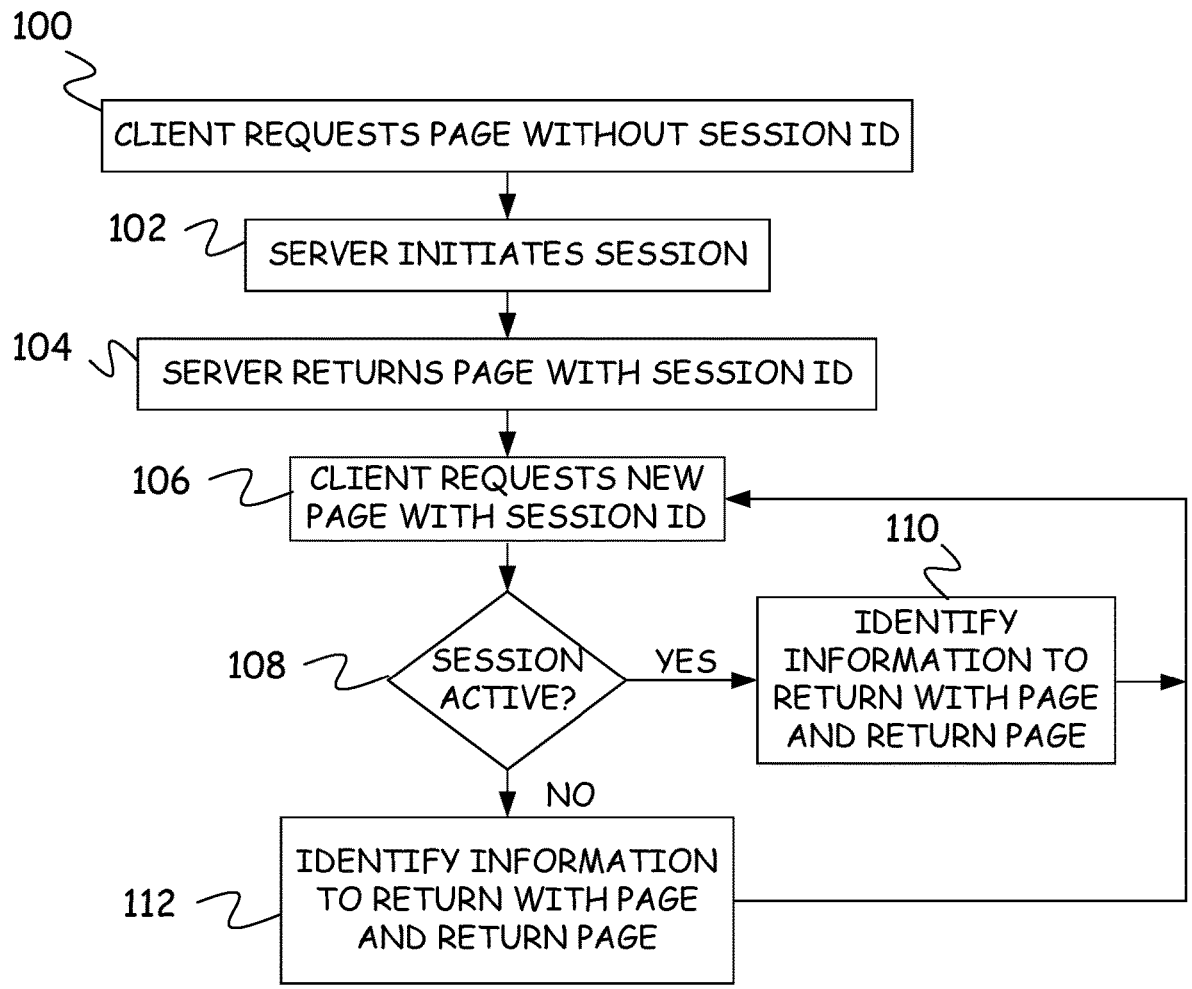
FIG. 1 is a flow diagram of a method in accordance with one embodiment.
Figure 2:
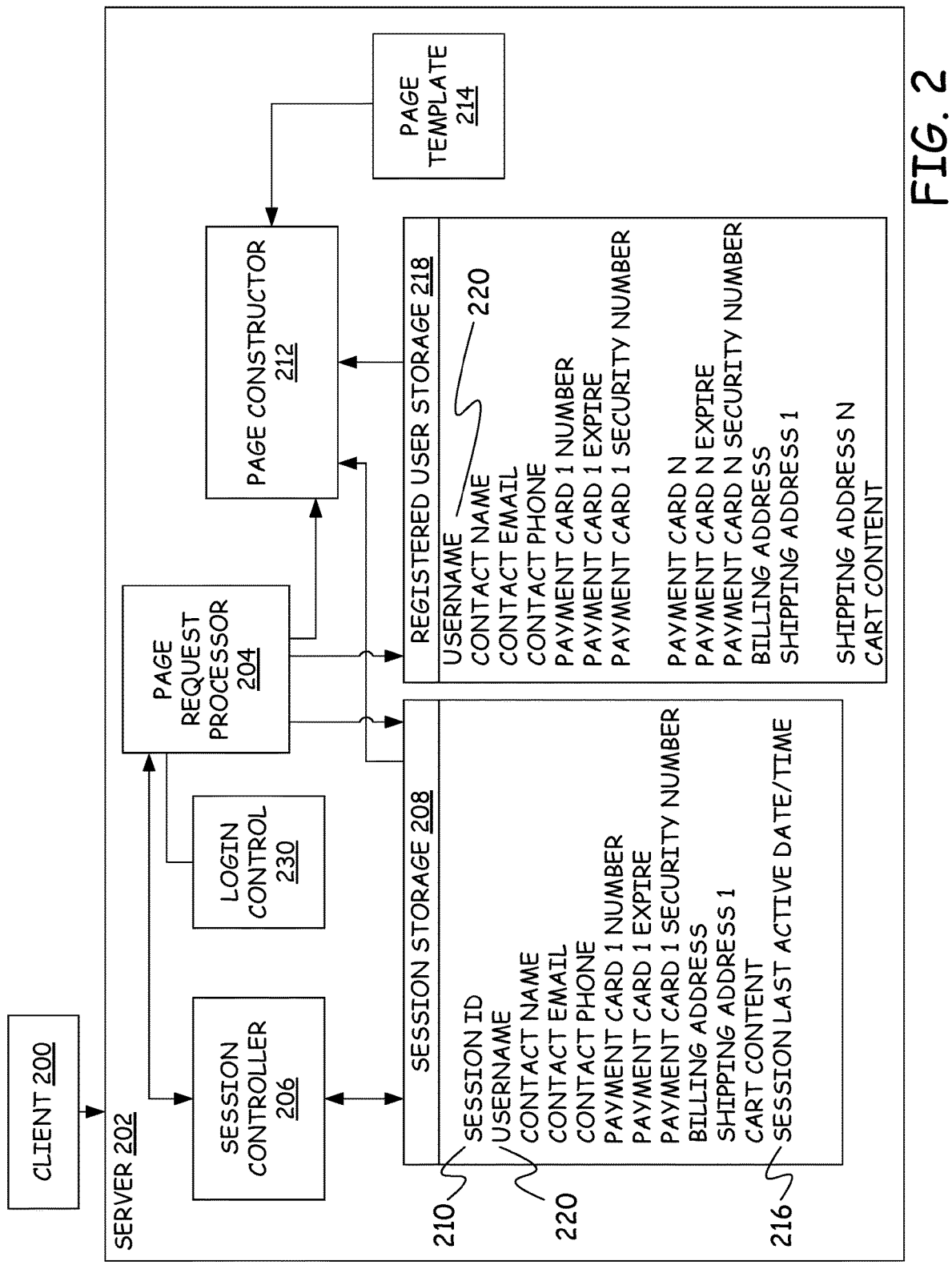
FIG. 2 is a block diagram of a system in accordance with one embodiment.

FIG. 1 provides a flow diagram of a method for returning webpages with different content depending on whether a session has expired. FIG. 2 provides a block diagram of a system that implements the method of FIG. 1. In step 100, a client device 200 sends a page request to a server 202 for a website page. The request does not include a session ID. Within server 202, a page request processor 204 examines the request and determines that it does not include a session ID. In response, page request processor 204 calls a session controller 206, which initiates a session at step 102. Initiating the session involves creating a record for the session in session storage 208, storing a session ID 210 for the session in the session record, and setting a last active date/time 216 in the session record. Last active date/time 216 keeps a record of the last time that client device 200 interacted with webserver 202 during the web session identified by session ID 210.

At step 104, page request processor 204 calls a page constructor 212, which uses a page template 214 for the requested page to construct the requested page. Page request processor 204 then returns the constructed page along with session ID 210 to client device 200.

Figure 3:
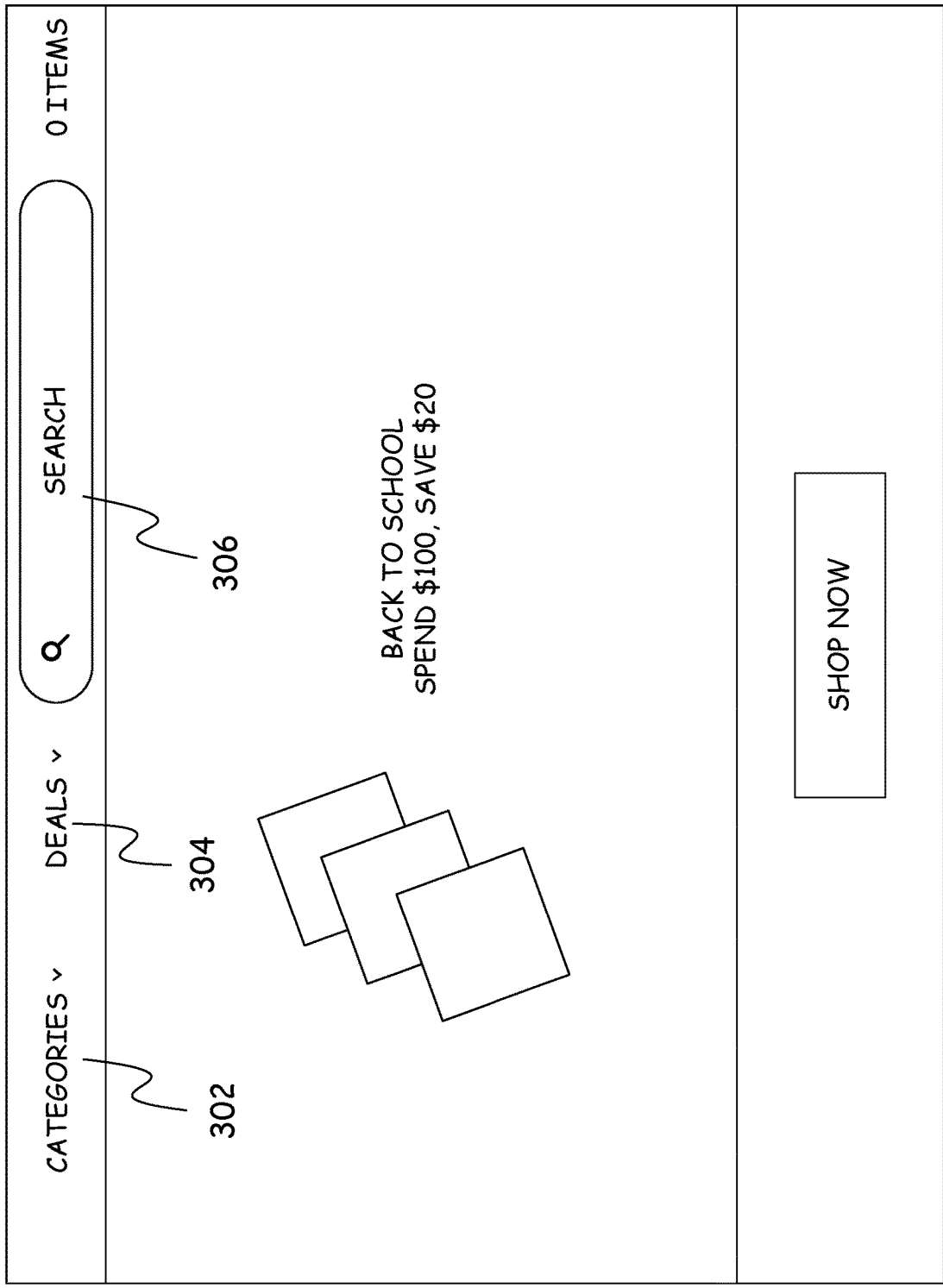
FIG. 3 is an example of a user interface showing a webpage returned by a webserver.

FIG. 3 provides an example user interface of an initial page returned at step 104. User interface 300 includes various controls such as controls 302, 304 and 306 for looking for products to purchase on the site.

At step 106, client device 200 requests a new webpage and provides the session ID 210 with the request. Page request processor 204 receives the request and asks session controller 206 whether the session is still active at step 108. Session controller 206 determines if a session is still active by examining last active date/time 216 in session storage 208 for the session. Session controller 206 compares last active date/time 216 to the current date/time and determines if the difference in time between the two values is greater than a preset session timeout period. If the difference is less than the timeout period, the session is considered to still be active and if the difference is greater than the session timeout period, the session is considered to have expired.

If the session is still active, the process of FIG. 1 continues at step 110 where page constructor 212 determines what information to include in a page template 214 to return to client device 200 for the active session. The constructed page is then returned to client 200 and last active date/time 216 is updated with the current time. If the session is no longer active at step 108, page constructor 212 identifies a different set of information at step 112 to return with the page for the expired session. After either steps 110 or 112, the process returns to step 106 to wait for client 200 to request a new page.

Figure 5:
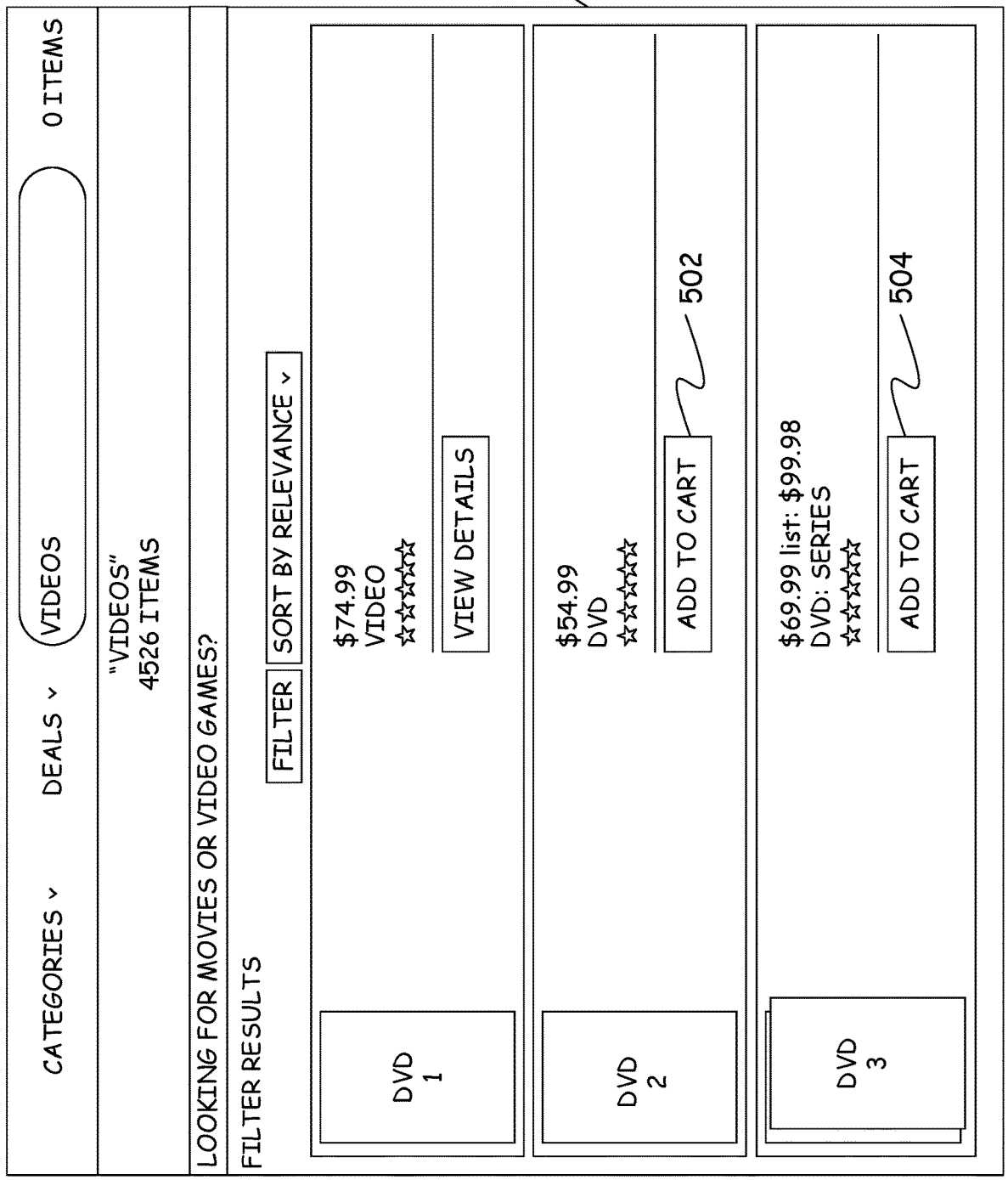
FIG. 5 is an example of a user interface for adding an item to a cart during an active session.

Examples of user interfaces displaying pages returned at step 110 while a session is active are shown in FIGS. 5, 6 and 7. In FIG. 5, user interface 500 depicts search results for a search of "videos". Many of the items returned in the search results include an "add to cart" control, such as add to cart controls 502 and 504. When these add to cart controls are selected, a request is sent to webserver 202 to add the corresponding video to an electronic cart that is maintained for the session. The electronic cart contains a set of products and services that the user of client device 200 has indicated they wish to purchase.

User interface 600 of FIG. 6 allows the user to enter contact information 604, shipping information 602 and a shipping method 606 for items placed in the cart. Contact information 604 includes an e-mail address and a phone number. Shipping information 602 includes a name and address for where the items are to be shipped. Shipping method 606 shows the contents of the cart and gives the user options for how quickly they want to receive the items. User interface 600 also includes an order summary 608 that provides the applicable charges associated with the user completing the purchase of the items in the shopping cart.

User interface 700 provides controls that allow a user to designate a payment method 702 and to set a billing address 704. The payment method can include payment by a credit card, a gift card, or an electronic payment service.

As long as the session remains active, the user is able to switch between user interfaces 500, 600 and 700 and any information that they have previously provided and saved will be retained. In particular, any items added to the shopping cart will remain in the shopping cart as long as the session is active. Similarly, if the user has designated contact information, a shipping address, a billing address or a payment method, any time webpages are returned that contain fields for the user-provided information, the fields will be filled with clear text showing the information previously provided by the user during the active session.

Figure 4:
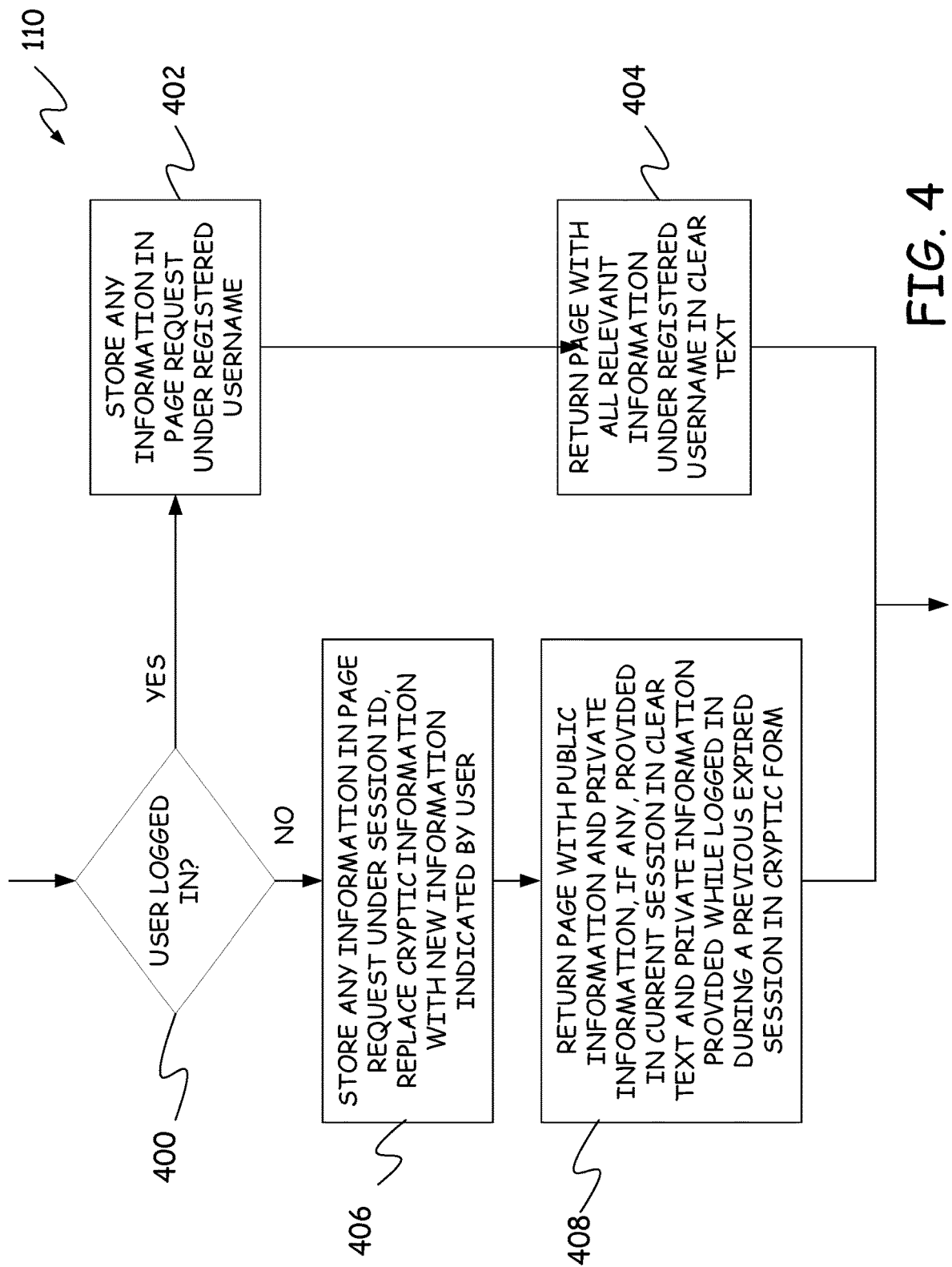
FIG. 4 is a flow diagram of a method of identifying and returning information in a page during an active session.

FIG. 4 provides a flow diagram of the method of step 110 for identifying and returning information with webpages during a currently active session. At step 400 of FIG. 4, page request processor 204 of webserver 202 determines if the user is currently logged in, using login control 230. In accordance with several of the embodiments, there are two types of users: guest users and registered users. A guest user is one who has not provided login credentials, such as a username and a password and a registered user is one who has provided login credentials. When a user has logged in, session information provided by the user is stored both in session storage 208 and in a registered user storage 218 where a separate record is provided for each registered user. Thus, information provided by the registered user, such as their name, email, phone number, billing address, shipping addresses, the current content of the cart and credit card information can all be stored in registered user storage 218. Unlike session storage 208, registered user storage 218 is more long term and can be maintained by the server over a number of years. In addition, when a user is logged in, the username 220 for the registered user is stored in both registered user storage 218 and session storage 208 and the information stored in registered user storage 218 is stored in a record for username 220. Since username 220 is in both session storage 208 and registered user storage 218, username 220 provides a link between the session storage record and the registered user storage record.

If the user is logged in at step 400, any information in the current page request is stored under username 220 in registered user storage 218 at step 402. The information may additionally be stored under session storage 208 for the current session. At step 404, page constructor 212 constructs the requested page using the corresponding page template 214 and any user-provided information required by the page template. In particular, the user-provided information is taken from the record for username 220 in registered user storage 218. Since the user is currently logged in, the information that is retrieved from registered user storage 218 is inserted as clear text in the constructed page. In this context, clear text means text with its normal appearance and without any masking. The constructed page is then returned to client device 200.

If the user is not logged in at step 400, any information provided in the page request is stored in session storage 208 under session ID 210. As discussed further below, if any masked or cryptic information has been stored in session storage 208 based on an earlier expired session, that masked or cryptic information can be overwritten with any clear text information provided in the page request. At step 408, page constructor 212 constructs the requested page using page template 214 and information from session storage 208. This information includes any information provided in the currently active session, which is returned as clear text, as well as cryptic information, which has been stored in the current session ID based on information provided in an earlier expired session as discussed further below.

Figure 8:
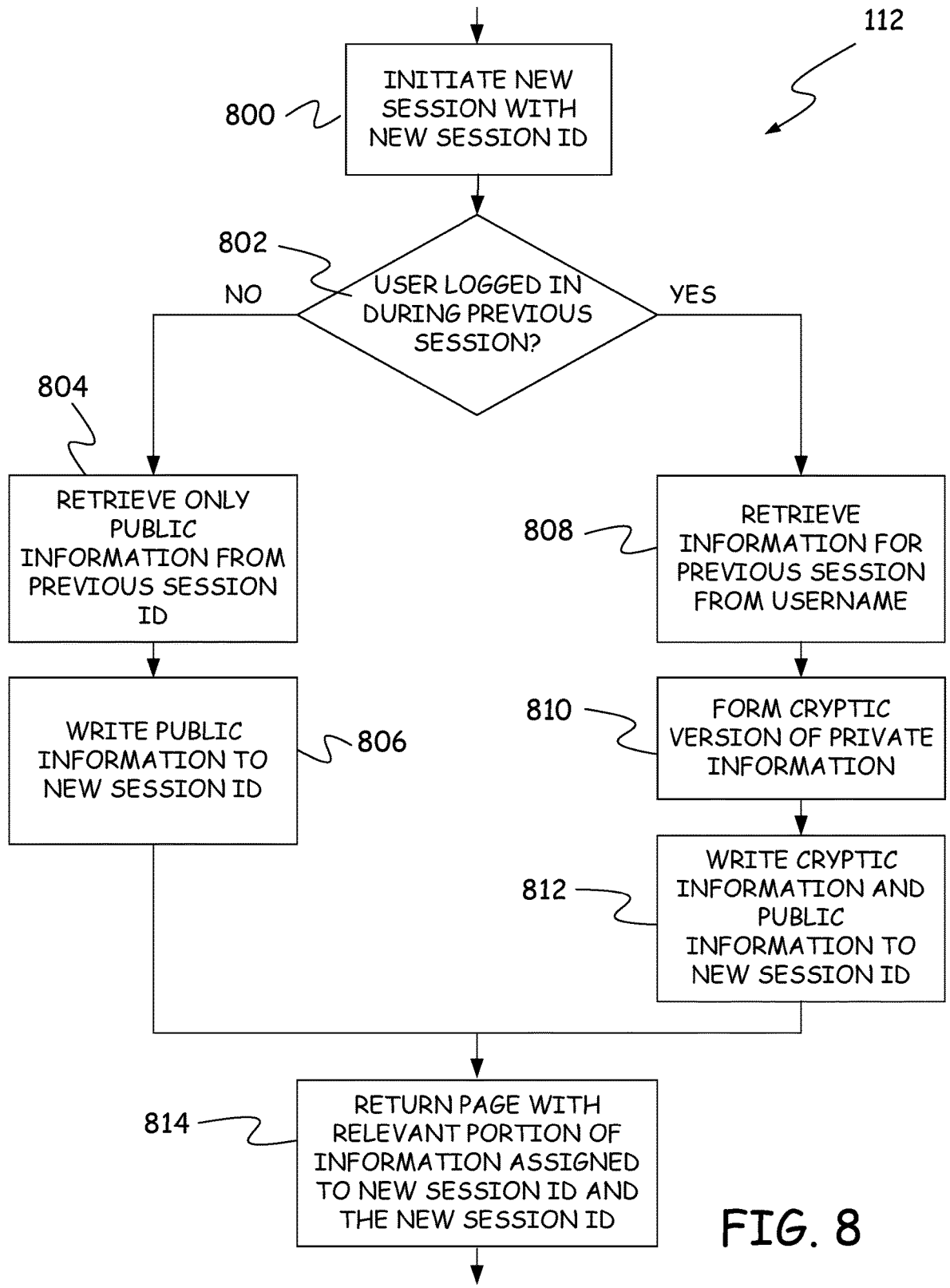
FIG. 8 is a flow diagram of a method of identifying and returning information when a session is no longer active.

FIG. 8 provides a flow diagram of the method of step 112 of FIG. 1 for identifying and returning information when the session ID returned at step 106 is deemed no longer active at step 108. Under most systems of the prior art, when a session is no longer active, all of the session information stored in session storage 208 is deleted and the user is automatically logged out if they had previously been logged in. As a result, information found in registered user storage 218 is no longer accessible under the prior art and all information from the previous session is permanently lost. Under the present embodiments, at least some of the information provided by the user during the expired session is returned in response to page request for pages that contain the information.

To achieve this, the process of FIG. 8 first initiates a new session with a new session ID at step 800 and then populates the session storage record for the new session ID using select parts of the information provided during the now-expired previous session. The amount of information used to populate the new session's record is dependent on whether the user was logged in during the now-expired previous session in accordance with some embodiments. Thus, at step 802, the method then determines if the user was logged in during the previous session.

If the user was not logged in during the previous session, page constructor 212 retrieves only public information from session storage 218 using session ID 210 of the now-expired previous session. Public information is considered to be information, which is not particular to a single person and therefor is not considered to be personal or private information. For example, the contents of an electronic shopping cart are not considered to be particular to a single person since any person could place the same contents in a shopping cart. As such the contents of the shopping cart are not considered to be personal or private information. However, contact information such as a name, email or phone number, billing addresses, shipping addresses, and payment methods, such as credit cards, are each considered to be personal/private information that is particular to a single individual. As such, this private information is not retrieved at step 804.

Information retrieved at step 804 is then written to session storage 208 under the new session ID created at step 800. Thus, for example, the contents of the shopping cart for the expired session are written as the shopping cart contents of the newly created session at step 806. Private information from the now-expired previous session is not written to session storage 208 and as a result, the fields for private information remain blank for the new session in session storage 208.

If it is determined at step 802 that the user was logged in during the previous session, all of the information for the previous session is retrieved from registered user storage 218 at step 808. In particular, using the now-expired session ID provided in the page request, page request processor 204 accesses the session record in session storage 208 for the now-expired session and retrieves username 220 for the previously logged-in user. Page request processor 204 then uses username 220 to locate the record in registered user storage 218 associated with the previously logged-in user. Page request processor 204 then retrieves all of the user-provided information from that record in registered user storage 218.

Any of the information in registered user storage 218 that is considered to be private is then masked to form cryptic versions of the private information at step 810. Applying such masks can include removing all but a select number of characters from the private information and/or changing some but not all of the characters to a generic character such as "x". This masking makes it impossible for someone who is unfamiliar with the information to discern what the information represents but allows the user who entered the information to identify what the cryptic version of the information actually represents. In step 810, information that is considered to be public is not masked and as a result remains in clear text form. Thus, for example, the contents of the shopping cart remain in clear text.

At step 812, the cryptic information and the clear text public information is written to session storage 208 under the new session ID. Thus, session storage 208 for the new session ID will include cryptic versions of information received during a previous now-expired session. At step 814, after step 806 or step 812 described above, page constructor 212 constructs the requested page using page template 214 and the information needed by page template 214 that is stored in session storage 208 for the new session ID. This information can include clear text public information, cryptic information and blank fields. The clear text public information can come from either a previous now-expired session when the user was logged in or when the user was not logged in. The cryptic information comes from a previous now-expired session when the user was logged in. The empty fields can be the result of information that the user did not provide during the previous now-expired session or information that was not written to the new session ID at step 804 because it was considered to be private information.

Figure 11:
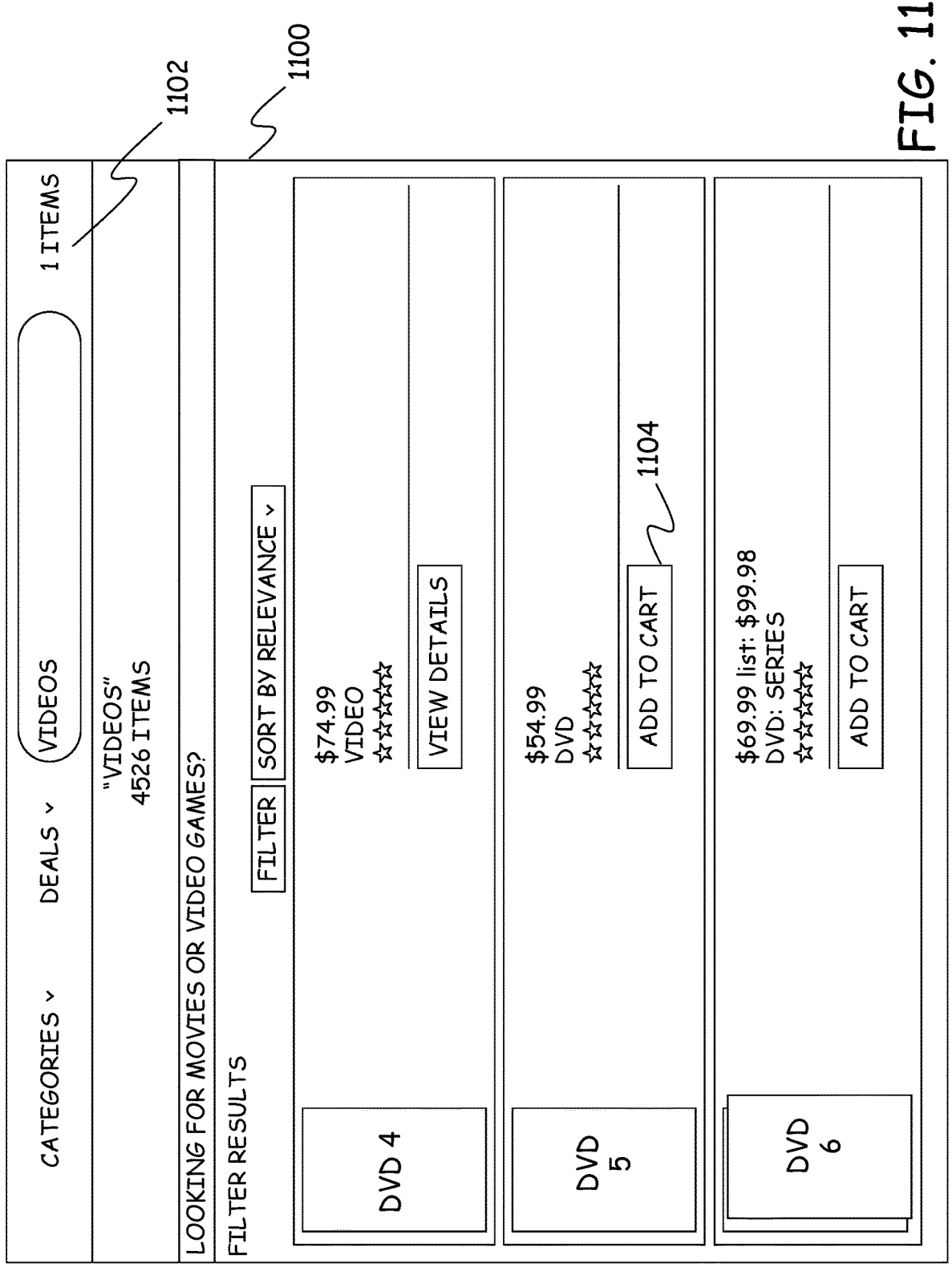
FIG. 11 provides an example user interface for adding an item to a cart that contains items from an expired session.

FIGS. 9, 10 and 11 show the results of the process of FIG. 8 based on the information provided through the user interfaces of FIGS. 5, 6 and 7 during a previous now-expired session. The user interfaces of FIGS. 9, 10 and 11 are produced with the user was not logged in during the previous now-expired session associated with FIGS. 5, 6 and 7.

As shown in FIGS. 6 and 7, during the previous now-expired session, the user had entered their contact information including their e-mail address and phone number; shipping information including a shipping name and address; a shipping method; credit card information including a credit card number, expiration date and security code; and billing address information including a billing name and billing address. In addition, the user had placed one video, DVD 2, in the cart.

When the user requests the page represented by user interface 900 of FIG. 9 while providing a session ID for the now-expired session of FIGS. 6 and 7 at step 106 of FIG. 1, session controller 206 determines that the session is inactive at step 108 and page request processor 204 performs step 112. This involves performing the steps shown in the flow diagram of FIG. 8.

At step 800 of FIG. 8, a new session is initiated with a new session ID and a determination is made as to whether the user was logged in during the previous session. For the examples of FIGS. 9-11, the user was not previously logged in. As a result, step 804 is performed and only the public information from the previous session ID is retrieved from session storage 208. This public information includes the contents of the shopping cart in the examples of FIGS. 9-11. At step 806, this public information is written to session storage 208 under the new session ID. The other private information of the previous session is not written to the new session ID. The page is then returned to client device 200 at step 814 using the contents stored in session storage 208 for the new session ID.

In FIG. 9, user interface 900 is shown to be substantially different from user interface 700 of FIG. 7 in which the user had previously entered information during the previous session. In particular, all information relating to the credit card has been removed and all information relating to the billing address has been removed in user interface 900. However, the order summary information 908 indicating the price, delivery cost and tax for the items in the shopping cart is the same as order summery information 708 of user interface 700 since that information is not particular to any individual but instead is deemed to be public information.

Similarly, FIG. 10 shows user interface 1000 generated under the same circumstances as user interface 900 of FIG. 9. Comparing user interface 1000 of FIG. 10 to user interface 600 of FIG. 6, which both depict a same webpage but with different information, it can be seen that user interface 1000 does not include the private information found in user interface 600. For example, contact information 604 has been replaced with blank contact information 1004, and shipping address information 602 has been replaced with blank shipping information 1002. Therefore, the private information entered during the active session associated with user interface 600 cannot be seen after the session expires even when a client device 200 provides the session ID for the previously active session.

Although the private information of the previous now-expired session of user interface 600 has been removed from user interface 1000, the public information, such as the contents of the shopping cart shown in shipping method 606 and shipping method 1006 and the order summary information 608, 1008 are the same in user interface 600 and user interface 1000. Thus, not all of the information of the expired session has been removed and the user is still able to see and use public information that is not particular to any one individual.

Because the shopping cart in the new session contains the same items as the expired session, it is possible for a user to add items to the existing shopping cart. For example, in user interface 1100 of FIG. 11, a shopping cart icon 1102 indicates that one item is already in the shopping cart even though the new session has just started. In addition, "an add to cart" button 1104 is provided that allows a user to add new items to the shopping cart copied from the previously expired session. FIG. 12 shows a user interface 1200 with the results of a user selecting "add to cart" button 1104. As shown in FIG. 12, the video previously placed in the cart during the previous now-expired session appears as video DVD 2 and the new video selected by the selection of control button 1104 appears as video DVD 5. However, the contact information 1206 and the shipping address 1208 continue to be blank and do not contain the information entered in those fields during the previous now-expired session. In order to complete the transaction, the user must reenter the contact information 1206 and the shipping address 1208.

Because various embodiments maintain the contents of the shopping cart from a previous now-expired session, the user does not have to refill their entire shopping cart every time a session expires. Instead, in the new session, the items placed in the shopping cart during the previous session are all still present thereby reducing the amount of work that the user must perform and the computational load on the retail webserver associated with the user searching for and selecting items for their cart. At the same time, however, all of the private information of the individual has been removed thereby providing security to the individual. Thus, the various embodiments provide a balance between securing personal information and reducing the computational workload associated with supporting a user's search for and selection of items to place in their cart.

FIGS. 13 and 14 provide user interfaces 1300 and 1400 that represent the same webpages as depicted in user interfaces 600 and 700 of FIGS. 6 and 7. User interfaces 1300 and 1400 of FIGS. 13 and 14 are generated after the session corresponding to user interfaces 600 and 700 has expired. In addition, user interfaces 1300 and 1400 are produced based on a determination that a user was logged in during the previous now-expired session associated with user interfaces 600 and 700.

When a user requests the webpages of user interfaces 1300 or 1400 at step 106 of FIG. 1 with the session ID of the previous now-expired session, session control 206 determines that the session expired at step 108 and step 112 is performed to determine what information to include in user interfaces 1300 and 1400.

As depicted in the flow diagram of FIG. 8, performing step 112 involves initiating a new session with a new session ID at step 800 and determining at step 802 that the user was logged in during the previous session. As a result, at step 808, page request processor 204 first retrieves username 220 from the record in session storage 208 associated with the now-expired session ID 210 provided with the page request. Page request processor 204 then uses username 220 to locate the user's record in registered user storage 218 and retrieves all of the information in that user record. Cryptic versions of the private information in the record from registered user storage 218 are formed at step 810 and the cryptic information and public information are written to session storage 208 under the new session ID at step 812. The cryptic private information and the clear text public information are then returned at step 814 as depicted in user interfaces 1300 and 1400 of FIGS. 13 and 14.

For example, in FIG. 13, cryptic version 1304 of contact information 604 of FIG. 6 is provided where only the first letter of the email address, the first letter after the @ symbol and ".com" are provided for the email address, and only the first number of the phone number is provided. All other characters in those fields have been replaced by "x" to form a masked or cryptic version of the private text. Similarly, shipping address information 602 has been replaced with cryptic shipping information 1302, such as a cryptic versions of the full name, address, city and zip code. The cryptic information in fields 1302 and 1304 is enough for the person who entered the information to identify what is being referred to but is not enough for others to learn anything meaningful about the private information. The public information present in shipping method 606 and order summary 608 continues to be shown in user interface 1300 in clear text as shipping method 1306 and order summary 1308. This includes information about the content of the electronic shopping cart.

Similarly, in FIG. 14, private information from user interface 700 including credit card information 702 and billing address information 704 is returned in a cryptic fashion to appear as cryptic credit card information 1402 and cryptic shipping information 1404. The cryptic credit card information includes only the last three numbers of the credit card number and the cryptic shipping address information only includes selected characters of the shipping information with the other characters replaced by a character placeholder, such as "x". The cryptic information in fields 1402 and 1404 is enough for the person who entered the information to identify what is being referred to but is not enough for others to learn anything meaningful about the private information. Order summary 1406 of FIG. 14 appears in clear text since it refers to items in the shopping cart which are public.

Because cryptic information is provided in user interfaces 1300 and 1400, if the user who was previously logged in is the same person requesting the webpages, the user will understand what the webpages contain and will not have to reenter the information into the webpages. Thus, by providing cryptic versions of the information, a previously logged in user does not have to reenter any of the information. At the same time, if a different user than the user who was previously logged in is requesting the webpages, they have not gained any access to the private information of the previously logged in user because it has been masked. As a result, the present embodiments reduce the computational load on the server associated with receiving reentered information from a previously logged in user, while at the same time preserving that user's private information and secrecy from other users.

Users are able to modify any of the cryptic information returned at step 814 and to resubmit the new information to server 202. When this occurs, the new information is stored in session storage 208. For example, in user interface 1500, a user has changed the phone number in contact information 1304 of FIG. 13 and has entered clear text information 1504. When the user selects SAVE & CONTINUE control 1510, a client's request for a new page with the current session ID is received at step 106 of FIG. 1. This new page request includes the new clear text information of the phone number 1504. At step 108 of FIG. 1, session controller 206 determines that the new session is active and the process of FIG. 1 continues at step 110. Within step 110, as depicted in FIG. 4, login control 230 determines that the user is not logged in at step 400 and any information in the page request is stored under the session ID at step 406. This includes replacing any cryptic information with new clear text information provided by the user. Thus, at step 406, clear text phone number 1504 of user interface 1500 is written over the cryptic phone number stored in session storage 208 for the new session ID. Note that the clear text information provided does not overwrite any information in registered user storage 218 because the user has not logged in at step 400. As a result, the registered user's information is secured against malicious changes by other users.

Figure 16:
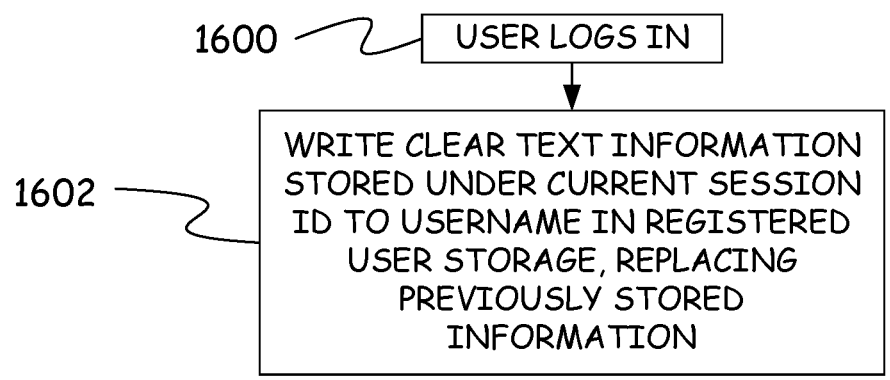
FIG. 16 provides a flow diagram of a method of logging in a user.

The cryptic information provided in session storage 208 cannot be used to complete a transaction. In order to complete a transaction using the true information represented by the cryptic information, a user must first login. FIG. 16 provides a flow diagram of a method performed when a user logs in after providing information during a session. In step 1600 of FIG. 16, a user provides their login credentials through a webpage and these login credentials are verified by login control 230 to log the user into their registered account. At step 1602, clear text information stored under the current session ID is copied to the registered user storage 218 for the registered user replacing any previously stored information in registered user storage 218. Note that fields that have no values are not copied. As a result, if a field in session storage 208 does not have a value, either because no value was ever provided or because the value was not transferred over from a previous now-expired session, the corresponding information in registered user storage 218 is not overwritten with a blank. As a result, any information in registered user storage 218 corresponding to a blank field in session storage 208 is not deleted. In addition, fields containing cryptic information in session storage 208 are not copied at step 1602. As a result, the clear text represented by the cryptic information is maintained for those fields in registered user storage 218.

For example, since phone number 1504 of user interface 1500 is stored in session storage 208 as clear text, page request processor 204 will overwrite the previous phone number stored in registered user storage 218 with phone number 1504. However, since the e-mail address of FIG. 15 is stored as a cryptic value in session storage 208, page request processor 204 will not overwrite the corresponding clear text e-mail address stored in registered user storage 218 with the cryptic value.

The result of step 1602 is a combination of information stored under registered user storage 218 with some of the information coming from a previous now-expired session when the user was logged in and other information coming from a current session when the user was not logged in.

After the user has logged in, page constructor 212 will use information from registered user storage 218 to construct pages. As a result, the pages will contain information from a previous now-expired session when the user was logged in and other information coming from a current session when the user was not logged in. For example, FIG. 17 depicts a user interface 1700 that includes contact information 1704 that is a combination of information entered during a previous now-expired session when the user was logged in, such as email address 1706, and information entered during a current session while the user was not logged in, such as phone number 1708. In addition, shipping address information 1710 represents information that was entered during the previous now-expired session and shopping cart 1712 and order summary 1714 represent the public shopping cart contents entered during the now-expired session.

Figure 18:
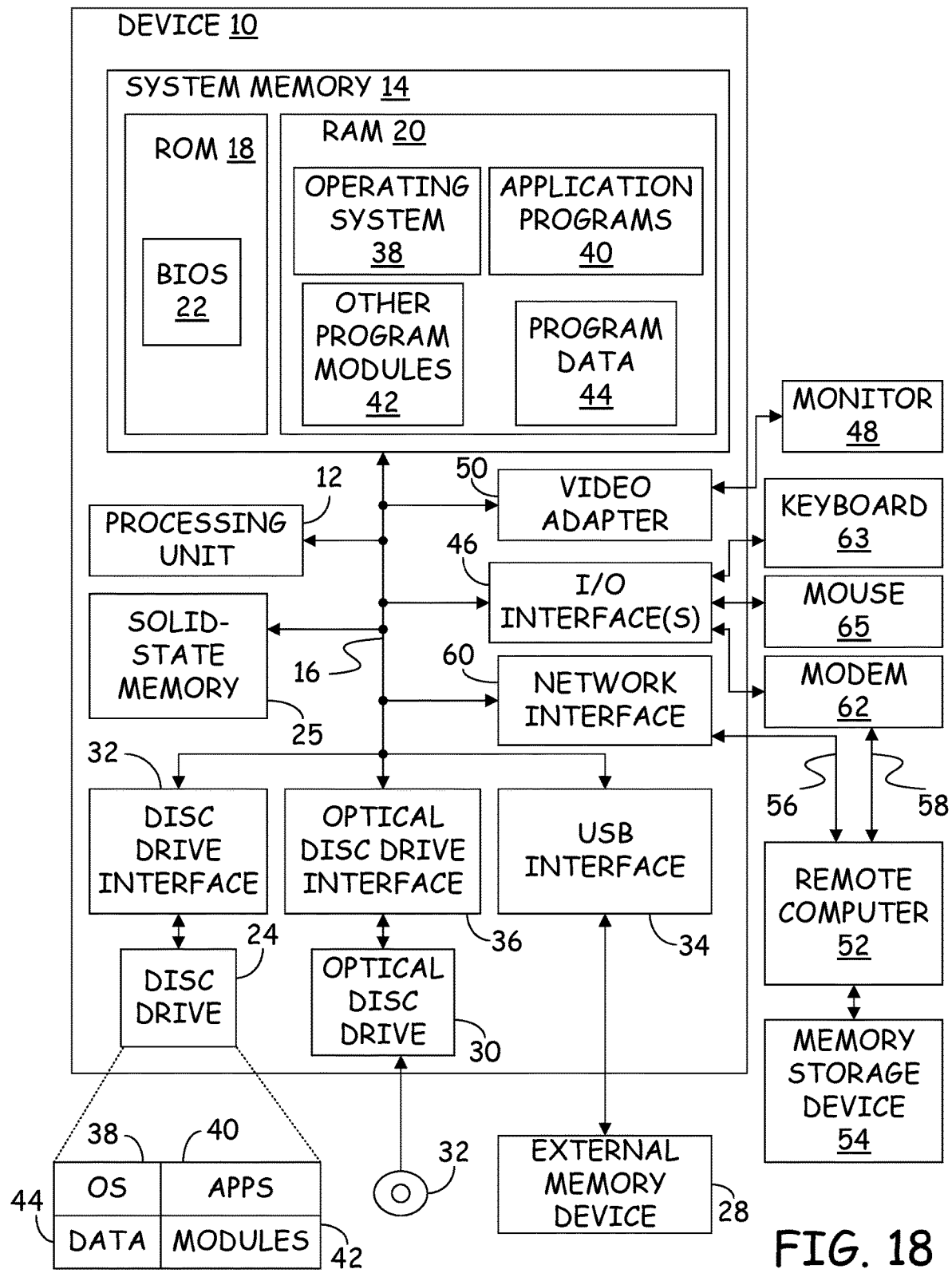
FIG. 18 provides a block diagram of a computing device that can be used as a server or mobile device in the various embodiments.

FIG. 18 provides an example of a computing device 10 that can be used as a server device or client device in the embodiments above. Computing device 10 includes a processing unit 12, a system memory 14 and a system bus 16 that couples the system memory 14 to the processing unit 12. System memory 14 includes read only memory (ROM) 18 and random access memory (RAM) 20. A basic input/output system 22 (BIOS), containing the basic routines that help to transfer information between elements within the computing device 10, is stored in ROM 18. Computer-executable instructions that are to be executed by processing unit 12 may be stored in random access memory 20 before being executed.

Embodiments of the present invention can be applied in the context of computer systems other than computing device 10. Other appropriate computer systems include handheld devices, multi-processor systems, various consumer electronic devices, mainframe computers, and the like. Those skilled in the art will also appreciate that embodiments can also be applied within computer systems wherein tasks are performed by remote processing devices that are linked through a communications network (e.g., communication utilizing Internet or web-based software systems). For example, program modules may be located in either local or remote memory storage devices or simultaneously in both local and remote memory storage devices. Similarly, any storage of data associated with embodiments of the present invention may be accomplished utilizing either local or remote storage devices, or simultaneously utilizing both local and remote storage devices.

Computing device 10 further includes an optional hard disc drive 24, an optional external memory device 28, and an optional optical disc drive 30. External memory device 28 can include an external disc drive or solid state memory that may be attached to computing device 10 through an interface such as Universal Serial Bus interface 34, which is connected to system bus 16. Optical disc drive 30 can illustratively be utilized for reading data from (or writing data to) optical media, such as a CD-ROM disc 32. Hard disc drive 24 and optical disc drive 30 are connected to the system bus 16 by a hard disc drive interface 32 and an optical disc drive interface 36, respectively. The drives and external memory devices and their associated computer-readable media provide nonvolatile storage media for the computing device 10 on which computer-executable instructions and computer-readable data structures may be stored. Other types of media that are readable by a computer may also be used in the exemplary operation environment.

A number of program modules may be stored in the drives and RAM 20, including an operating system 38, one or more application programs 40, other program modules 42 and program data 44. In particular, application programs 40 can include programs for implementing any one of page request processor 204, session controller 206, and page constructor 212, for example. Program data 44 may include data such as data in session storage 208, registered user storage 218 and page templates 214, for example.

Processing unit 12, also referred to as a processor, executes programs in system memory 14 and solid state memory 25 to perform the methods described above.

Input devices including a keyboard 63 and a mouse 65 are optionally connected to system bus 16 through an Input/Output interface 46 that is coupled to system bus 16. Monitor or display 48 is connected to the system bus 16 through a video adapter 50 and provides graphical images to users. Other peripheral output devices (e.g., speakers or printers) could also be included but have not been illustrated. In accordance with some embodiments, monitor 48 comprises a touch screen that both displays input and provides locations on the screen where the user is contacting the screen.

The computing device 10 may operate in a network environment utilizing connections to one or more remote computers, such as a remote computer 52. The remote computer 52 may be a server, a router, a peer device, or other common network node. Remote computer 52 may include many or all of the features and elements described in relation to computing device 10, although only a memory storage device 54 has been illustrated in FIG. 18. The network connections depicted in FIG. 18 include a local area network (LAN) 56 and a wide area network (WAN) 58. Such network environments are commonplace in the art.

The computing device 10 is connected to the LAN 56 through a network interface 60. The computing device 10 is also connected to WAN 58 and includes a modem 62 for establishing communications over the WAN 58. The modem 62, which may be internal or external, is connected to the system bus 16 via the I/O interface 46. Order 206 is received through either network interface 60 or modem 62.

In a networked environment, program modules depicted relative to the computing device 10, or portions thereof, may be stored in the remote memory storage device 54. For example, application programs may be stored utilizing memory storage device 54. In addition, data associated with an application program may illustratively be stored within memory storage device 54. It will be appreciated that the network connections shown in FIG. 18 are exemplary and other means for establishing a communications link between the computers, such as a wireless interface communications link, may be used.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms for implementing the claims.

What is claimed is:

1. A method comprising:
   receiving a request for a webpage together with an identifier for an expired session;
   determining whether a user was logged in during the expired session and when the user was logged in during the expired session:
      retrieving personal information associated with the user from a record for the user instead of a record for the expired session;
      masking the personal information so that only a portion of each item of personal information is in clear text; and
      storing the masked personal information in a record for the new session;
   returning the webpage such that the returned webpage contains the masked personal information from the record for the new session;
   receiving replacement text that a user entered by replacing masked personal information returned in the webpage, the text received along with the identifier for the new session; and
   storing the replacement text in the record for the new session but not the record for the user.

2. The method of claim 1 further comprising: receiving a request for a second webpage together with the identifier for the new session; and returning the second webpage with the replacement text in clear text and at least some of the masked personal information.

3. The method of claim 2 further comprising:
   receiving an indication that the user logged in during the new session; and storing the replacement text so that the replacement text replaces personal information in the record for the user.

4. The method of claim 3 further comprising:
receiving a request for a third webpage after the user logged in during the new session;
returning the third page with the replacement text and at least some personal information entered during the expired session in clear text.

5. A server comprising:
a processor performing steps comprising:
receiving a request for a webpage together with an identifier for an expired session;
determining whether a user was logged in during the expired session and when the user was logged in during the expired session:
  retrieving personal information associated with the user from a record for the user instead of a record for the expired session;
  masking the personal information so that only a portion of each item of personal information is in clear text; and
  storing the masked personal information in a record for the new session;
returning the webpage such that the returned webpage contains the masked personal information from the record for the new session;
receiving replacement text that a user entered by replacing masked personal information returned in the webpage, the text received along with the identifier for the new session; and
storing the replacement text in the record for the new session but not the record for the user.

6. The server of claim 5 wherein the processor performs further steps comprising: receiving a request for a second webpage together with the identifier for the new session; and returning the second webpage with the replacement text in clear text and at least some of the masked personal information.

7. The server of claim 6 wherein the processor performs further steps comprising:
receiving an indication that the user logged in during the new session; and
storing the replacement text so that the replacement text replaces personal information in the record for the user.

8. The server of claim 7 wherein the processor performs further steps comprising:
receiving a request for a third webpage after the user logged in during the new session;
returning the third page with the replacement text and at least some personal information entered during the expired session in clear text.

9. A computer-implemented method comprising: receiving a request for a webpage together with an identifier for an expired session;
determining whether a user was logged in during the expired session and when the user was logged in during the expired session:
  retrieving personal information associated with the user from a user record separate from a record for the expired session;
  masking the personal information so that only a portion of each item of personal information is in clear text; and
  storing the masked personal information in a record for the new session;
returning the webpage such that the returned webpage contains the masked personal information from the record for the new session;
receiving replacement text that a user entered by replacing masked personal information returned in the webpage, the text received along with the identifier for the new session; and
storing the replacement text in the record for the new session but not the user record.

10. The computer-implemented method of claim 9 further comprising: receiving a request for a second webpage together with the identifier for the new session; and returning the second webpage with the replacement text in clear text and at least some of the masked personal information.

11. The computer-implemented method of claim 10 further comprising:
receiving an indication that the user logged in during the new session; and
storing the replacement text so that the replacement text replaces personal information in the user record.

12. The method of claim 11 further comprising:
receiving a request for a third webpage after the user logged in during the new session;
returning the third page with the replacement text and at least some personal information entered during the expired session in clear text.

* * * * *